April 12, 1960 V. O. ARMSTRONG 2,932,353
SIMPLIFIED CONTROLS FOR A RAM JET HELICOPTER
Filed Oct. 8, 1956 8 Sheets-Sheet 1

INVENTOR
VICTOR O. ARMSTRONG

April 12, 1960 V. O. ARMSTRONG 2,932,353
SIMPLIFIED CONTROLS FOR A RAM JET HELICOPTER
Filed Oct. 8, 1956 8 Sheets-Sheet 2

INVENTOR
VICTOR O. ARMSTRONG

INVENTOR
VICTOR O. ARMSTRONG

April 12, 1960 V. O. ARMSTRONG 2,932,353
SIMPLIFIED CONTROLS FOR A RAM JET HELICOPTER
Filed Oct. 8, 1956 8 Sheets-Sheet 5

INVENTOR
VICTOR O. ARMSTRONG

April 12, 1960 V. O. ARMSTRONG 2,932,353
SIMPLIFIED CONTROLS FOR A RAM JET HELICOPTER
Filed Oct. 8, 1956 8 Sheets-Sheet 6

*INVENTOR*
VICTOR O. ARMSTRONG

United States Patent Office 2,932,353
Patented Apr. 12, 1960

2,932,353
SIMPLIFIED CONTROLS FOR A RAM JET HELICOPTER

Victor O. Armstrong, Pacoima, Calif.

Application October 8, 1956, Serial No. 614,510

7 Claims. (Cl. 170—135.7)

This invention relates to helicopters, particularly to a simplified control mechanism for a helicopter.

Previous helicopters have used a "swash plate" with the attendant linkages, bearings, etc. together with a control stick to position the "swash plate" in order to attain directional control of the helicopter. It is necessary with previous control mechanisms to change the angle of incidence of the blades to attain a desired angle on the tip path plane. The changing of the angle of incidence is accomplished in each revolution of the blade to maintain the desired directional control. Vertical motion of the helicopter is accomplished by changing the angle of incidence of all blades.

It is the object of this invention to control the direction of motion of the helicopter by positioning the entire blade system at a desired angle and thereby eliminate the attendant mechanisms required in conventional helicopters.

Another object of this invention is to present a system so simplified that the helicopter can be maneuvered by the use of only a stick and a means of changing engine revolutions per minute.

Still another object of this invention is to show a means of controlling the starting and stopping of a ram jet engine by means of an electric motor and a system of bevel gears.

Still another object of this invention is to show a control mechanism which does not require a swash plate or the mounting and control mechanism required therefor.

Still another object of this invention is to show a mechanism which operates in a sphere so that an infinite number of angles can be attained for the tip path plane.

Yet another object of this invention is to show a hydraulic control system so designed that there can be no loss of control when the aircraft is forced to descend due to engine failure because the hydraulic pump is driven by the auto-rotating blades.

The invention set forth in this application is identical in principle with that set forth in my co-pending application Serial Number 520,335, filed July 6, 1955, with the exception that the present application shows a hydraulic system and the retention of the upper portion of the control sphere is by means of shafts and a universal joint rather than by means of a hollow shaft.

These and other unique features will be apparent upon examining the accompanying drawings wherein.

Figure 1:
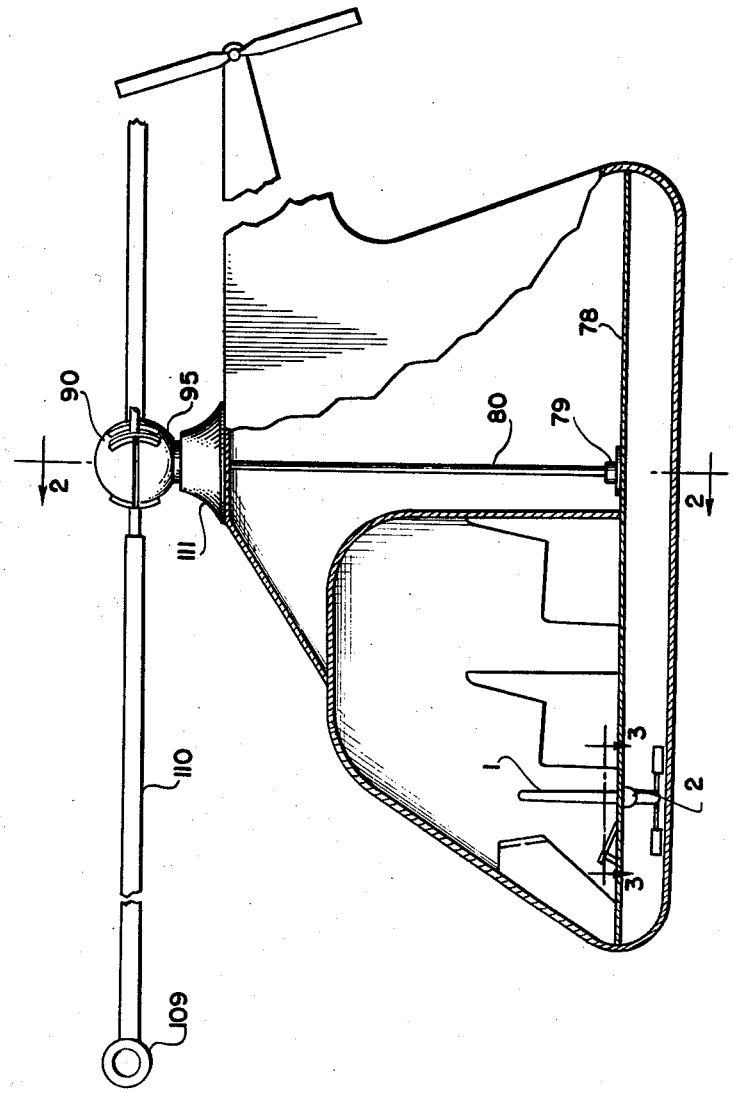
Fig. 1 is a side elevation of the helicopter showing the relative location of the component parts.

Referring in more detail to the drawings:

Fig. 1 shows a helicopter composed of a fuselage with provisions for passengers in the forward section. A retaining shaft 80 is shown extending from the floor 78 and being retained in fitting 79. This shaft is shown extending into a spherical head 90 which carries a number of blades 110. The blades are shown having ram jet engines 109 attached to their tips. Located in the forward section of the fuselage is shown a control stick 1 and a torque tube 2.

Figure 2:
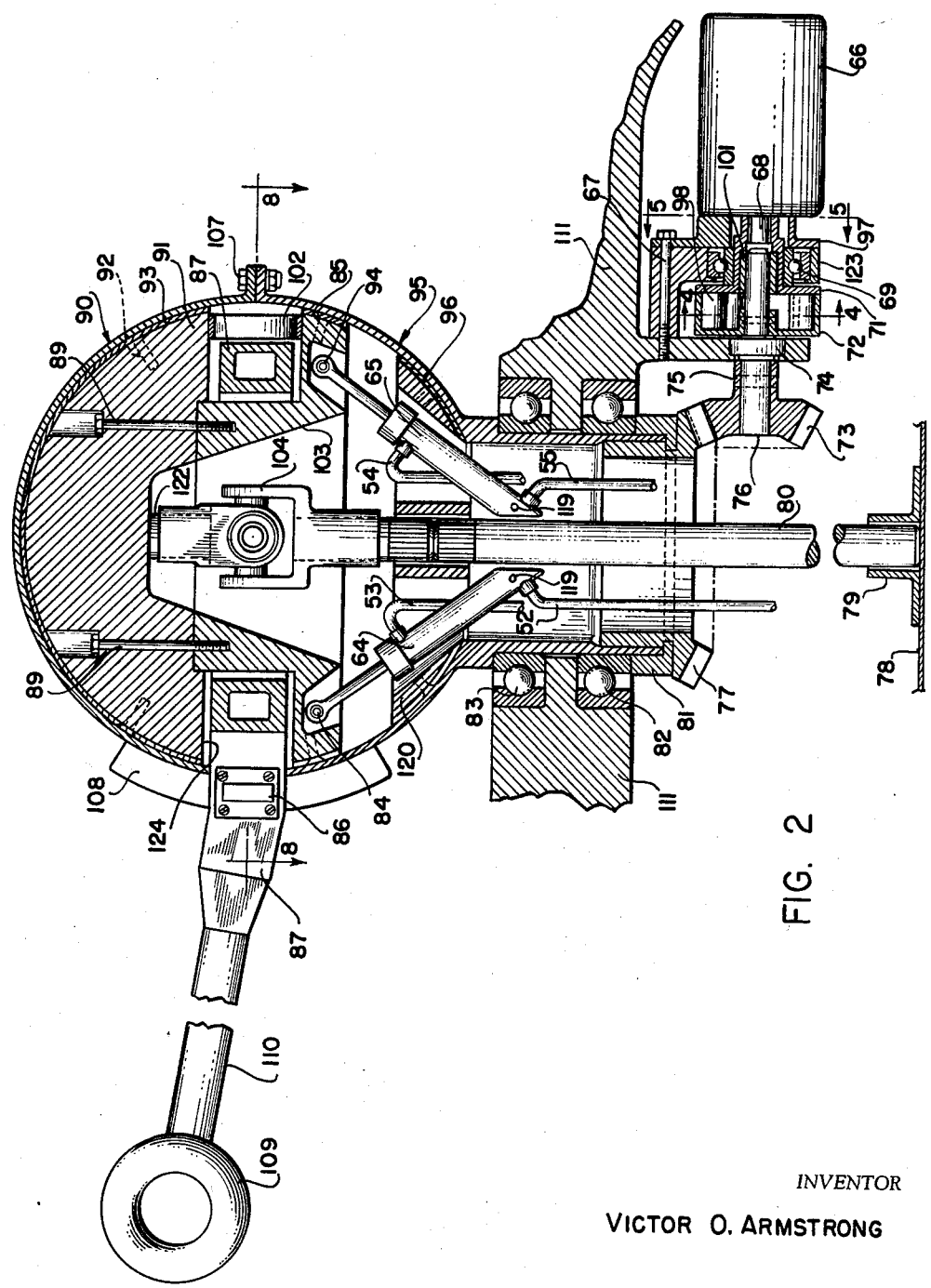
Fig. 2 is a view taken on the vertical center line looking forward through the control mechanism.
Figure 10:
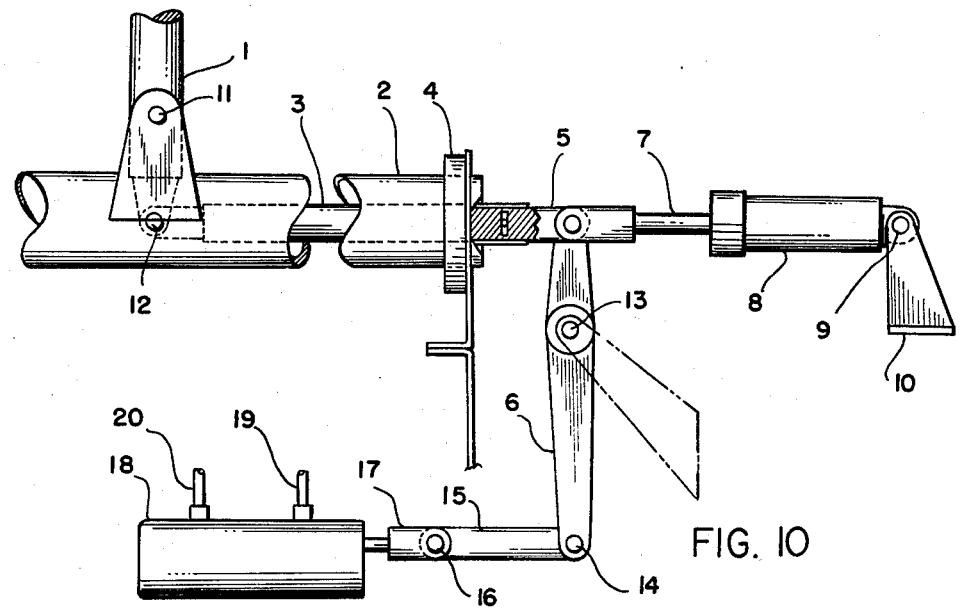
Fig. 10 is a view showing the linkage between the control stick, the lateral control valve and the loading bungee.

The control stick 1 (Fig. 10) is made to pivot about pin 11 thereby moving shaft 3 which is attached to the control stick by pin 12. The movement of shaft 3 rotates bellcrank 6 about pin 13. Pin 13 attaches bellcrank 6 to the fuselage structure and is thereby fixed at its point of rotation. The rotating of bellcrank 6 moves link 15 in a lateral direction thereby positioning shaft 17 which positions the control mechanism in control valve 18 to apply pressure to the respective sides of actuating cylinders 64 and 65 (Fig. 2). Link 15 is attached to bellcrank 6 by pin 14 and to control valve 18 by pin 16 through shaft 17. Attached to the end of shaft 3 (Fig. 3) is fitting 5 which is free to rotate in shaft 3 but is retained in compression and tension. Shaft 7 which is a part of loading bungee 8 is attached to bellcrank 6 and to fitting 5. The lateral motion of stick 1 moves shaft 7 in loading bungee 8 causing a load on stick 1 and furnishing means of retaining the stick in a given position. Loading bungee 8 is attached to structure by bracket 10 and pin 9.

Figure 7:
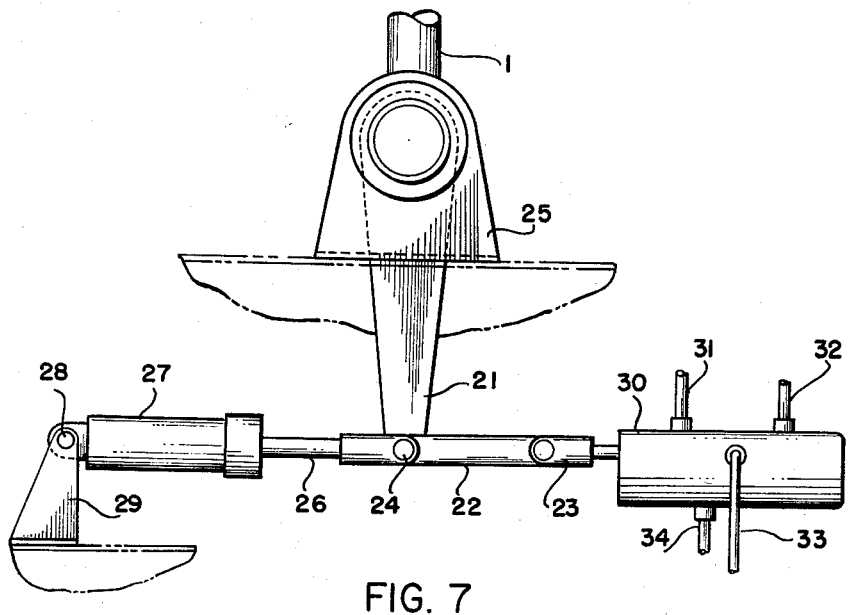
Fig. 7 is a view showing the linkage between the fore and aft control valve, the control stick and a loading bungee.
Figure 11:
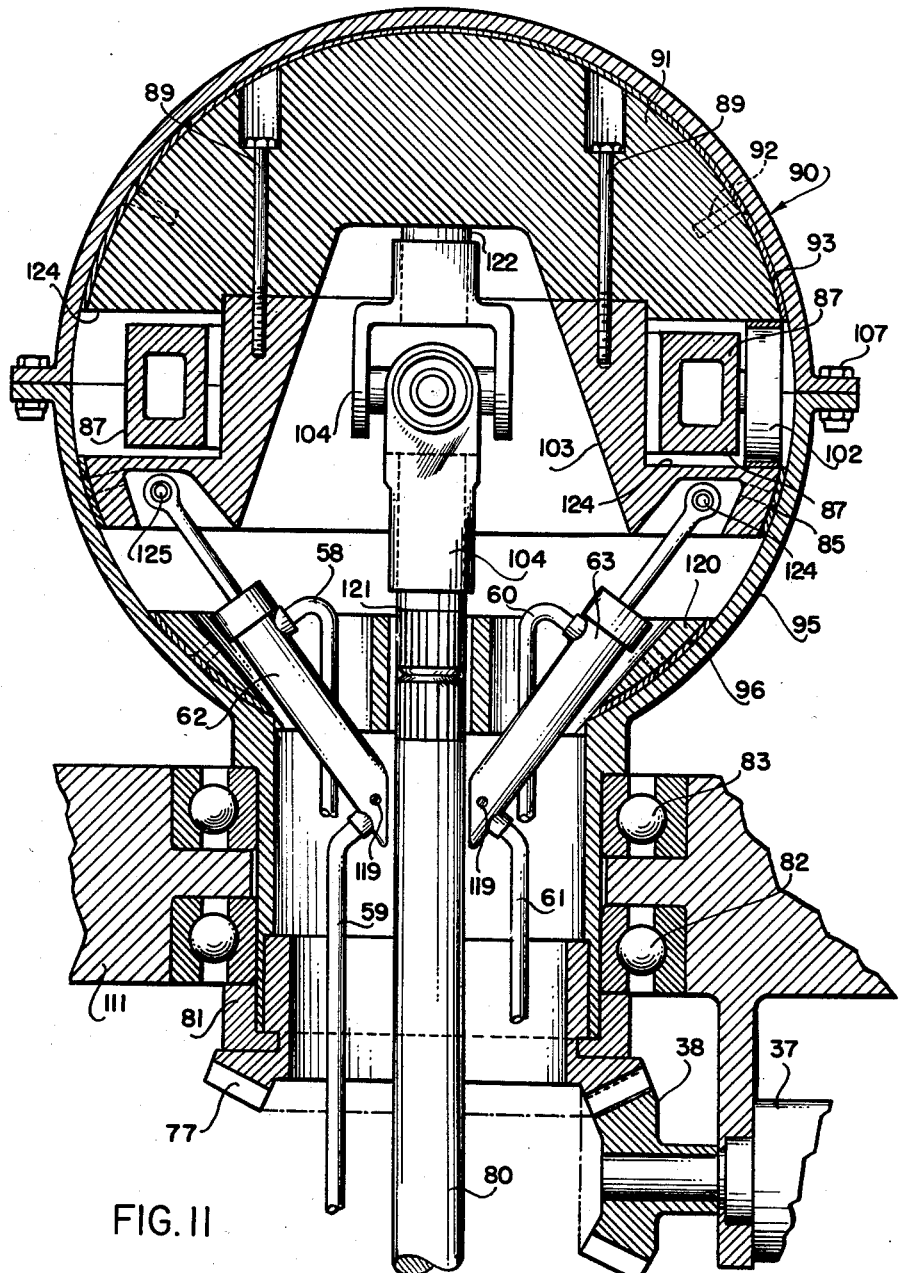
Fig. 11 is a view taken on the fore and aft vertical center line showing the location of the hydraulic pump and the fore and aft actuating cylinders.

Stick 1 is attached to the fore and aft control valve 30 by bellcrank 21 (Fig. 3) link 22, fitting 23 and pin 24. Bellcrank 21 is pinned to torque tube 2 to prevent rotation. Fore and aft motion of stick 1 (Fig. 7) moves link 22 through pin 24 and fitting 23 so as to position control valve 30. Control valve 30 supplies pressure to the respective sides of actuating cylinders 62 and 63 (Fig. 11). The fore and aft motion of control stick 1 positions loading bungee 27 through shaft 26 thereby applying a load to the stick. Loading bungee 27 retains the stick in any desired position and is attached to the fuselage structure by bracket 29 and pin 28. Loading bungees 8 and 27 can be any of a variety of standard components which require a force for displacement and have the property of remaining in the dispaced position.

Control valves 18 and 30 are attached to the fuselage structure so as to remain motionless during operation.

Figure 3:
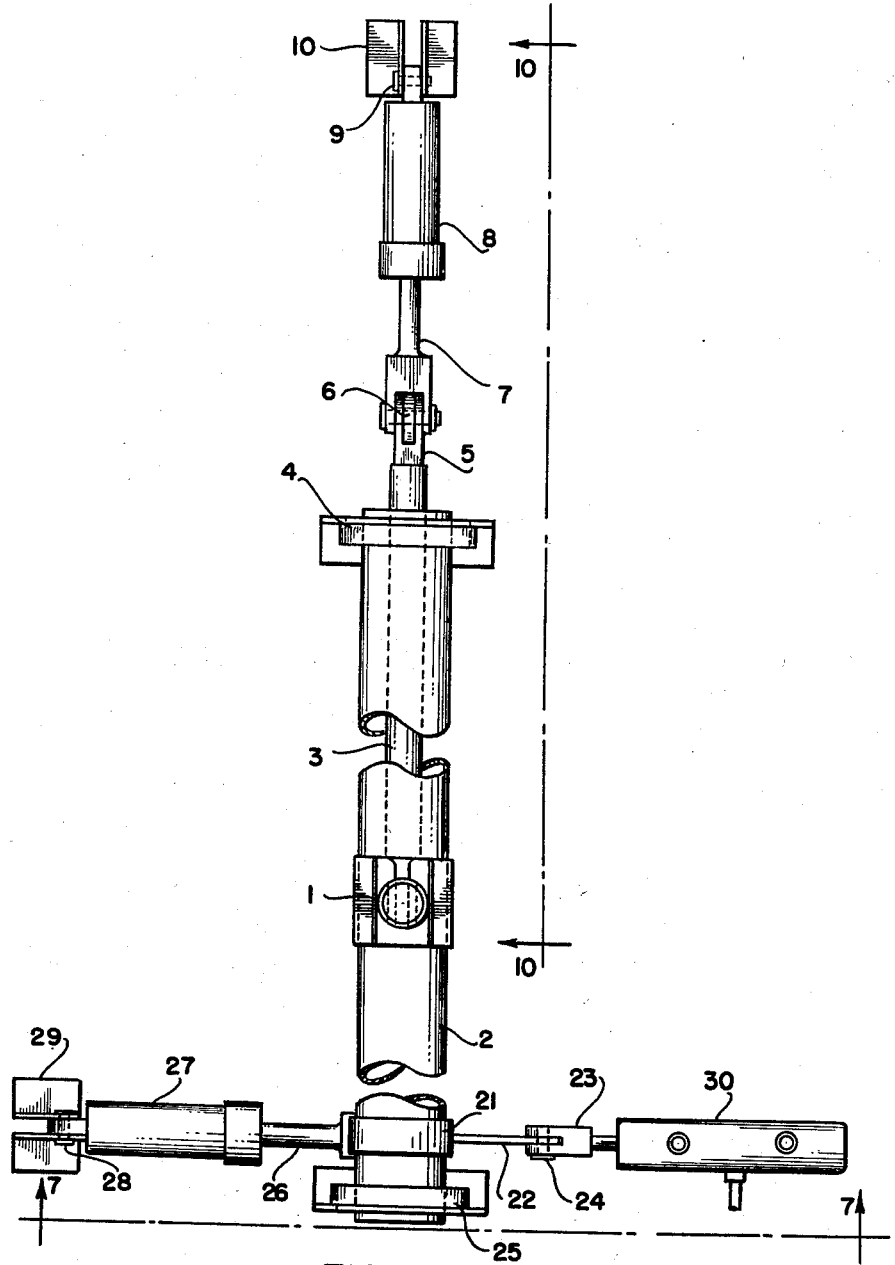
Fig. 3 is a plan view showing the attachment of the control stick to the torque shaft linkage and control valves.
Figure 5:
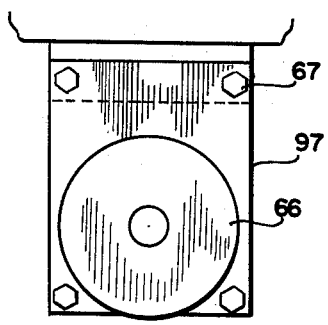
Fig. 5 is a view showing the mounting of the electric starting motor.
Figure 4:
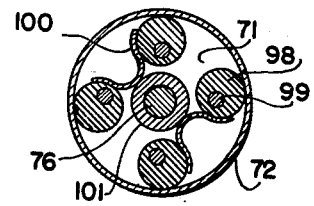
Fig. 4 is a view showing the clutch arrangement which attaches the starting motor to the bevel drive gear.

Torque shaft 2 is mounted to the fuselage structure through bearing and bearing supports 4 and 25 (Fig. 3).

It will be obvious from the foregoing discussion that the stick is loaded in any direction and is capable of positioning control valve 18 and 30 in any desired position.

Control valves 18 and 30 (Fig. 13) are connected to actuating cylinders 62, 63, 64 and 65 by a hydraulic system which functions as follows: Hydraulic pump 37 is mounted to the support 111 in such a manner that bevel gear 38 is in mesh with bevel gear 77 (Fig. 11). The hydraulic pump being driven by bevel gears 38 and 77 supplies fluid under system pressure from reservoir 35 (Fig. 13) through conduits 39 and 40 to by-pass valve 41 which is set to release above system pressure. Pump 37 supplies fluid under pressure to accumulator 36 through conduit 43 until system pressure is exceeded. When system pressure is exceeded, by-pass valve 41 releases and allows the return of fluid through conduit 42 to reservoir 35.

Control valves 18 and 30 are connected to accumulator 36 by supply conduits 44, 33 and 46. Dividing means 45 distributes this pressurized fluid to control valves 18 and 30.

Figure 13:
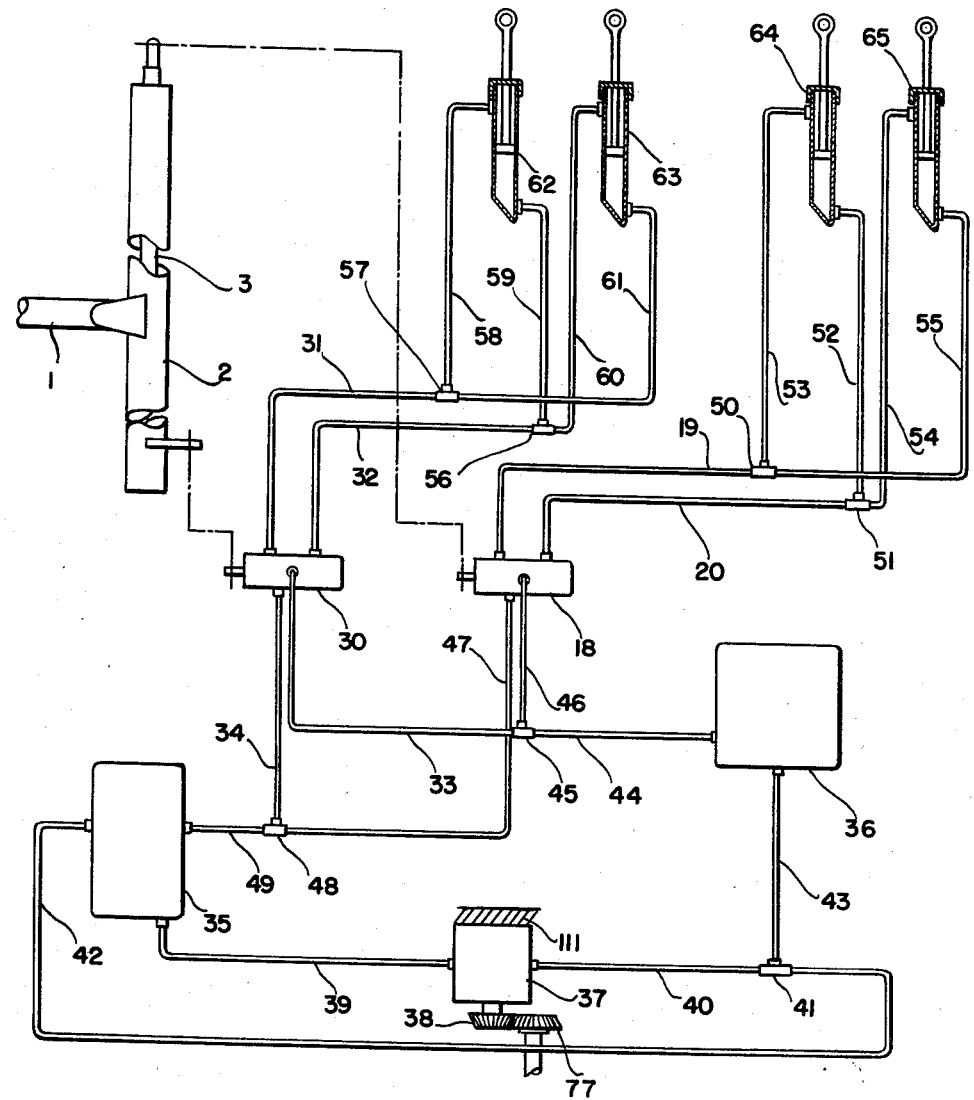
Fig. 13 is a schematic drawing of the hydraulic system described in this application.

Positioning of control valve 30, as previously explained, by stick 1 allows fluid under pressure to extend or retract actuating cylinders 62 and 63. Actuating cylinders 62 and 63 are connected to control valve 30 by conduits 31, 32, 58, 59, 60 and 61 and dividing means 57 and 56 in such a manner that when the actuating cylinder 62 is extended actuating cylinder 63 is retracted (Fig. 13).

Control valve 18 is connected to actuating cylinders 64 and 65 by conduits 19, 20, 53, 52, 54 and 55 and dividing means 50 and 51 in such a manner that when actuating cylinder 64 is extended actuating cylinder 65 is retracted.

Figure 14:
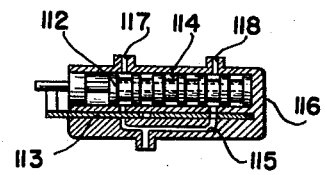
Fig. 14 is a cutaway view of valves 18 and 30.

The detail operation of control valves 18 and 30 is shown in Figure 14. Spool 112 is caused to move in housing 116 by the movement of stick 1. With the control valve in the position shown in Figure 14, fluid under pressure will be supplied to area 114 and thence through inner section of barrel to area 117 where it is supplied to the actuating cylinder. Area 118 in this position acts as a return line and allows fluid to pass through and around spool 112 through slide valve 113 into chamber 115 and through the respective tubes to reservoir 35. When stick 1 repositions spool 112, area 117, because slide valve 113 has moved with spool 112, acts as a return line through slide valve 113 to chamber 115 while fluid under pressure is supplied to the actuating cylinders through area 118.

It will be seen from the foregoing discussion that when tick 1 is moved forward actuating cylinder 63 will extend while actuating cylinder 62 (Fig. 13) will retract. Likewise moving the stick 1 to the left will extend actuating cylinder 65 and retract actuating cylinder 64. If the stick 1 is moved aft actuating cylinder 62 will extend and actuating cylinder 63 will retract. Likewise if stick 1 is moved to the right actuating cylinder 64 will extend while actuating cylinder 65 will retract.

Actuating cylinders 62, 63, 64 and 65 (Fig. 2) are attached to lower section of control sphere 120 by pins 119 and at their upper ends to upper portion of control sphere 103 by self aligning bearings 84, 94, 124 and 125. The control sphere is composed of three parts 91, 103 and 120. A section is removed below the horizontal center line of the control sphere to allow for positioning of the assembly 91 and 103 by actuating cylinders 62, 63, 64 and 65. The control sphere is retained within the spherical head which is composed of an upper section 90 and a lower section 95. Bolts 107 are used to attach the upper and lower sections.

The upper section of the control sphere 91 and 103 is fabricated in two parts to facilitate assembly and disassembly and to make possible the removal of blade yoke 87. Blade yoke 87 (Figure 8) is fabricated in segments, each segment of which includes a guide end capable of sliding within the adjoining segment to permit relative motion between the blades when they are displaced from a neutral position by actuating cylinders 62, 63, 64 and 65. The guide on said segment is fabricated as an arc of a circle to allow free relative motion.

Bolts 89 are used in connection with a standard register to align the two parts to secure them and to cause that to operate as a single unit.

The lower section of the control sphere 120 is retained from rotating or tilting by being splined to shaft 80 which extends through the fuselage and is splined in to fitting 79 which in turn is rigidly attached to floor 78.

The upper section of the control sphere 91 and 103 is retained from rotating by shaft 121 which is splined to the lower section of the control sphere 120 and to universal joint 104. The universal joint 104 is splined to shaft 122 which is rigidly attached to the upper portion of control sphere 91. It will be seen that the upper portion of the control sphere 91 and 103 is not retained from tilting in any direction.

From the foregoing discussion it will be seen that the upper portion of the control sphere 91 and 103 can be placed in an infinite number of positions around its center by the movement of control stick 1 which positions actuating cylinders 62, 63, 64 and 65.

A spherical bearing 85, 96 and 93 is attached to the upper and lower sections of the control sphere 91, 103 and 120 by screws 92 to reduce the coefficient of friction between mating parts of the spherical head 90 and 95 and control sphere 91, 103 and 120.

Figure 8:
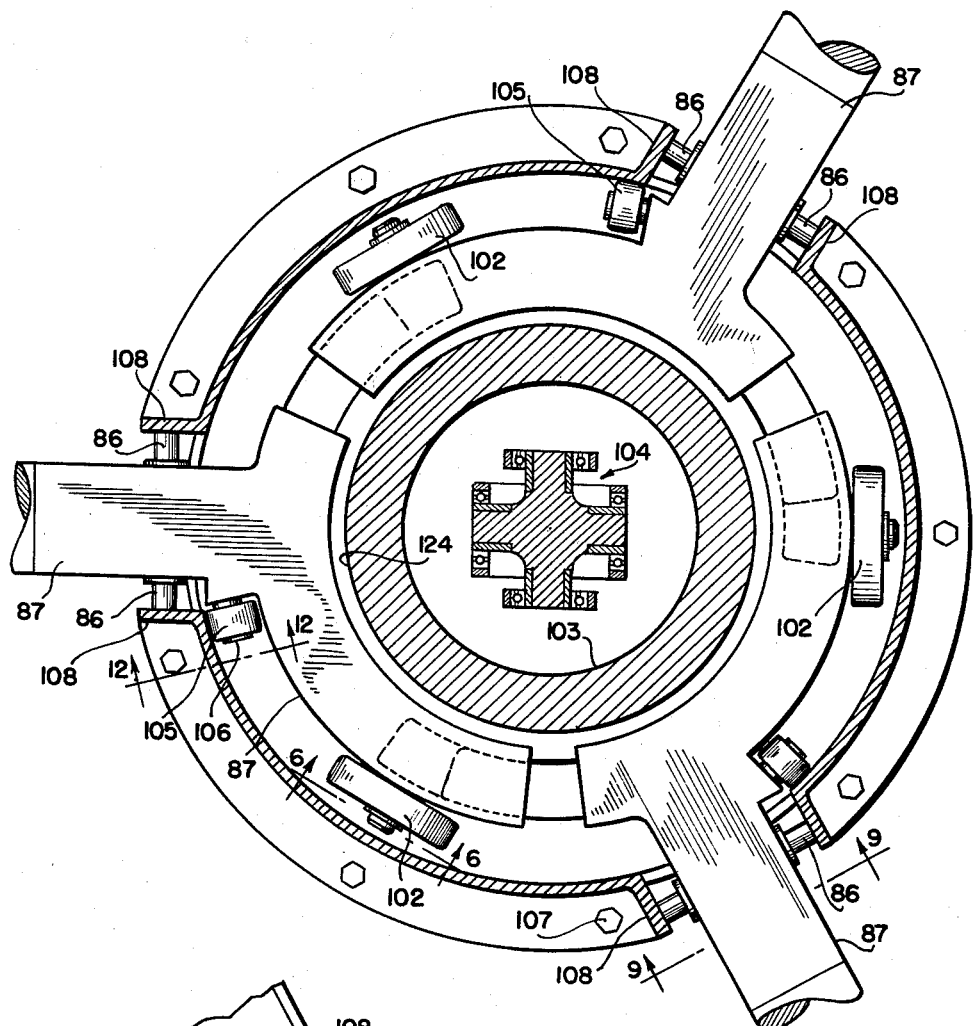
Fig. 8 is a plan view of the control mechanism taken approximately through the center line of the control sphere.
Figure 9:
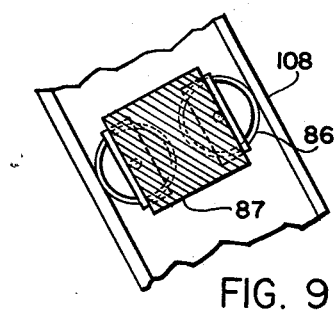
Fig. 9 is a view showing the retaining bearings for the blade yoke.

The upper portion of the control sphere 91 and 103 has a diametrical groove 124 machined on its circumference to receive blade yoke 87. Spherical head 90 and 95 has slots machined on its circumference to receive the hubs of blade yoke 87. (Fig. 8 and Fig. 9.)

Spherical head 90 and 95 has pairs of flanges 108 (Fig. 9) attached to its outer surface to receive the force of blade 110 through blade yoke 87 and bearings 86. The force transmitted to flanges 108 is generated by ram jet engines 109 (Fig. 2). The force supplied by ram jet 109, through flanges 108, rotates spherical head 90 and 95 and thereby rotates bevel gears 77 and 38. The hydraulic pump 37 is thereby caused to supply system pressure at any time the rotor blades are placed in rotation. This is an added safety feature since system pressure will be supplied to the hydraulic system at any time the blades are rotating.

Figure 6:
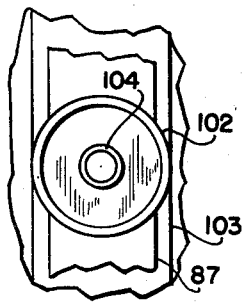
Fig. 6 is a view showing the mounting of the retaining bearings on the blade yoke and its retention in a diametrical groove in the control sphere.

Bearings 102 (Fig. 6) retain blade yoke 87 in the diametrical groove machined in the upper section of control sphere 91 and 103. Bearing 102 is attached to blade yoke 87 and rotates with it in diametrical groove 124 as the blade yoke 87 is caused to rotate by ram jet 109.

Figure 12:
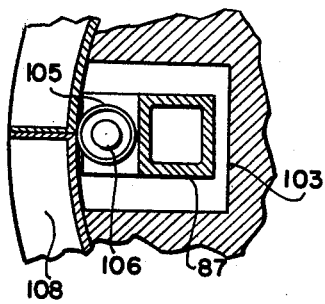
Fig. 12 is a view showing the attachment of the bearings used to retain the control yoke concentric with the spherical head.

Rollers 105 (Fig. 12) retain the blade yoke 87 concentric with the spherical head 90 and 95. Bearing 106 is attached to blade yoke 87 and rotates against the inner surface of spherical head 90 and 95.

Bevel gear 77 (Fig. 2) is splined into spherical head 95 and retained from moving vertically by nut 81. (Fig. 2.)

Meshed with bevel gear 77 is bevel gear 73 which is pinned to shaft 76 (Fig. 2) by pin 75. Shaft 76 runs in bearing 74 which is mounted in support 111. Drum 72 is pinned to shaft 76 and rotates with it. Shoe 71 is splined to shaft 68 of motor 66 and rotates with it. Motor 66 is mounted to support 111 on plate 97 and spacer 123 by bolts 67. Shoe 71 runs in bearing 69 which is mounted in spacer 123. Shaft 76 extends into shoe 71 and rotates in sleeve bearing 101.

Shoe 71 has 4 off center cams 98 attached to its surface which are caused to bear on drum 72 by spring 100. Off center cams 98 are mounted to shoe 71 by pins 99.

The rotation of motor 66 in a clockwise direction will cause off center cams 98 to wedge against drum 72 thereby causing shaft 76 to rotate as an integral part of shoe 71 and motor shaft 68. The rotation of shaft 76 will rotate bevel gear 73 which being meshed with bevel gear 77 will turn spherical head 90 and 95 and thence ram jet 109. When ignition speed has been attained by ram jet 109 and it has been ignited the relative motion between drum 72 and shoe 71 will be reversed and no power need be applied to motor 66 because the load has been removed. The ram jet 109 under this condition, which exists whenever the ram jet is in operation, will turn bevel gear 77 and 38 and drive hydraulic pump 37.

Bearing 82, installed in support 111, receives the load of the helicopter in flight and transmits it to the fuselage structure through support 111 (Fig. 2).

Bearing 83 supports the weight of the head, blades and ram jets when the helicopter is idling on its landing gear.

What I claim and desire to secure by Letters Patent is:

1. An aircraft including a fuselage comprising, an outer sphere rotatably secured to the fuselage, an inner sphere located within the outer sphere having a fixed portion secured to the fuselage and a movable portion adapted to move relative to the fixed portion, a plurality of rotor blades carried by the movable portion of the inner sphere and projecting through the outer sphere and adapted to follow the movement of the movable portion relative to the fuselage, piston and cylinder assemblages connected between the movable portion of the inner sphere and the fuselage, a drive mechanism supported on the fuselage operably connected to the outer sphere for rotating the outer sphere, and hydraulic control means supported on the fuselage for selectively actuating the piston and cylinder assemblages for tilting the movable portion of the inner sphere respective to the fixed portion whereby the lift vector of the blades is placed in a desired position.

2. An aircraft including a fuselage comprising, an outer sphere rotatably secured to the fuselage, an inner sphere located within the outer sphere having a fixed portion secured to the fuselage and a movable portion positionable relative to the fixed portion, a plurality of rotor blades carried by the movable portion of the inner sphere projecting through the outer sphere and being rotatable and positionable therewith relative to the fuselage, piston and cylinder assemblages operably connected between the movable portion of the inner sphere and the fuselage for selectively tilting the movable portion relative to the fixed portion, a drive mechanism supported on the fuselage and detachably coupled to the outer sphere for rotating the outer sphere, and hydraulic control means supported on the fuselage for selectively operating the piston and cylinder assemblages to tilt the movable portion of the inner sphere respective to the fixed portion whereby the lift vector of the blade is placed in a desired position.

3. An aircraft including a fuselage comprising, an outer sphere rotatably secured to the fuselage above and substantially in the middle thereof, an inner sphere located within the outer sphere having a fixed portion secured to the fuselage and a movable portion tiltable respective to the fixed portion, a plurality of rotor blades carried by the movable portion of the inner sphere projecting through the outer sphere and adapted to tilt in accordance with the movable position thereof, a universal joint means connecting the movable portion to the fuselage, piston and cylinder assemblages operably connected between the movable portion of the inner sphere and the fuselage, a starting drive mechanism supported on the fuselage and detachably connected to the outer sphere for rotating the outer sphere and rotor blades, and hydraulic control means supported on the fuselage for selectively operating the piston and cylinder assemblages to tilt the movable portion of the inner sphere respective to the fixed portion whereby the lift vector of the blade is placed in a desired position.

4. An aircraft including a fuselage comprising, an outer sphere rotatably secured to the fuselage above and substantially in the middle thereof, an inner sphere enclosed by the outer sphere having a fixed portion secured to the fuselage and a movable portion tiltable respective to the fixed portion, hydraulic piston and cylinder assemblages coupling the movable portion of the inner sphere to the fuselage, a plurality of rotor blades carried by the movable portion of the inner sphere projecting through the outer sphere to tilt with the movable portion, starting drive means supported on the fuselage and connected to the outer sphere for rotating the outer sphere respective to the fuselage, flange means projecting from the periphery of the outer sphere and engageable with the plurality of rotor blades for imparting a rotary movement of the outer sphere to the blades, and hydraulic control means supported on the fuselage for selectively operating the piston and cylinder assemblages for selectively tilting the movable portion of the inner sphere respective to the fixed portion whereby the lift vector of the blade is placed in a desired position.

5. An aircraft including a fuselage comprising, an outer sphere rotatably secured to the fuselage above and substantially in the middle thereof, an inner sphere enclosed by the outer sphere having a fixed portion secured to the fuselage and a movable portion spaced from the fixed portion and tiltable respective thereto, universal joint means connecting the movable portion to the fuselage, hydraulic piston and cylinder assemblages operably coupling the movable portion of the inner sphere to the fuselage, a plurality of rotor blades carried by the movable portion of the inner sphere projecting through the outer sphere and adapted to tilt in accordance with the movable portion, starting-driving means supported on the fuselage and connected to the outer sphere for rotating the outer sphere respective to the fuselage, flange means projecting from the periphery of the outer sphere and engageable with the plurality of rotor blades for imparting a rotary movement of the outer sphere to the blades, and hydraulic control means supported on the fuselage for selectively operating the piston and cylinder assemblages for selectively tilting the movable portion of the inner sphere respective to the fixed portion whereby the lift vector of the blade is placed in a desired position.

6. An aircraft including a fuselage comprising a hollow spherical head rotatably carried on the fuselage, rotor blades projecting from the hollow spherical head and arranged with respect to each other for elevation and driving the aircraft, a starting power source supported on the fuselage for driving the rotor blades via hollow spherical head, a control sphere disposed within the hollow spherical head joining the rotor blades within the spherical head, a plurality of hydraulically operated piston and cylinder assemblages operably coupled between the control sphere and the fuselage so that the sphere is tiltable within the spherical head with respect to the fuselage, and manually actuated hydraulic control means secured to the fuselage for operating the piston and cylinder assemblages for tilting the control sphere so that the lift vector of the blades is placed in a desired position.

7. An aircraft including a fuselage comprising, a hollow spherical head rotatably carried on the fuselage, rotor blades projecting from the hollow spherical head and arranged with respect to each other for elevation and driving the aircraft, a starting power source supported on the fuselage for driving the rotor blades via the hollow spherical head, a control sphere disposed within the hollow spherical head joining the rotor blades within the spherical head tiltable relative to the fuselage, universal joint means movably supporting the control sphere on the fuselage, a plurality of hydraulically operated piston and cylinder assemblages movably connecting the control sphere to the fuselage, and manually actuated hydraulic means for operating the piston and cylinder assemblages for tilting the control sphere about the universal joint means so that the lift vector of the blades is placed in a desired position.

References Cited in the file of this patent
UNITED STATES PATENTS

| | | |
|---|---|---|
| 2,224,357 | Pecker | Dec. 10, 1940 |
| 2,755,866 | Apostolescu | July 24, 1956 |
| 2,761,635 | Hiller | Sept. 4, 1956 |